United States Patent
Lord

(10) Patent No.: US 8,534,904 B2
(45) Date of Patent: Sep. 17, 2013

(54) APPARATUS FOR RESTARTING A GAS-SOLIDS CONTACTOR

(75) Inventor: Stephen Michael Lord, Encinitas, CA (US)

(73) Assignee: Lord Ltd., LP, San Diego, CA (US)

( * ) Notice: Subject to any disclaimer, the term of this patent is extended or adjusted under 35 U.S.C. 154(b) by 845 days.

(21) Appl. No.: 12/661,137

(22) Filed: Mar. 10, 2010

(65) Prior Publication Data

US 2011/0222365 A1 Sep. 15, 2011

(51) Int. Cl.
*B01F 13/02* (2006.01)
(52) U.S. Cl.
USPC .......................................... 366/101; 422/139
(58) Field of Classification Search
USPC .......... 366/101, 106, 107; 222/195; 34/360, 34/369; 422/139, 147; 406/136–138
See application file for complete search history.

(56) References Cited

U.S. PATENT DOCUMENTS

| | | | |
|---|---|---|---|
| 3,179,378 A * | 4/1965 | Zenz et al. | 366/106 |
| 3,818,606 A | 6/1974 | Marcellini | |
| 3,889,631 A | 6/1975 | Lackey | |
| 3,921,663 A | 11/1975 | Beranek et al. | |
| 4,213,938 A | 7/1980 | Pyzel | |
| 4,334,898 A | 6/1982 | Zhuber-Okrog et al. | |
| 4,711,039 A | 12/1987 | Napier | |
| 4,880,311 A * | 11/1989 | Delebarre et al. | 366/101 |
| 5,469,994 A * | 11/1995 | Reh et al. | 222/630 |
| 5,538,162 A * | 7/1996 | Reh et al. | 222/63 |
| 5,685,640 A * | 11/1997 | Goedicke et al. | 366/107 |
| 8,034,298 B2 * | 10/2011 | Fame | 422/141 |
| 2005/0001341 A1 | 1/2005 | Weinle | |
| 2011/0222365 A1* | 9/2011 | Lord | 366/101 |
| 2013/0149228 A1* | 6/2013 | Tomas Martinez et al. | 422/139 |

FOREIGN PATENT DOCUMENTS

EP 348007 A1 * 12/1989

OTHER PUBLICATIONS

Written Opinion and Search Report of International Application No. PCT/US2011/000126 mailed Nov. 7, 2011.

* cited by examiner

*Primary Examiner* — Charles E Cooley

(57) ABSTRACT

A gas-solids contactor modification is described which provides for starting or restarting the gas flow to the gas-solids contactor when it is filled with solid particles while preventing the solids from entering and blocking one or more gas inlets which have diameters greater than the solid particle diameters. The apparatus modification comprises a gas plenum and one or more chambers within the gas plenum located between the contactor inlet and the gas inlet. The wall of the chamber has multiple passageways therethrough that are smaller in diameter than the majority of the bed particles. Gas feed to the plenum must pass through the passageways in the chamber walls before entering the contactor. In one embodiment the total open area of the passageways is at least as large as the cross-sectional area of the gas inlet and the inlet to the contactor.

9 Claims, 7 Drawing Sheets

APPARATUS FOR RESTARTING A GAS-SOLIDS CONTACTOR

FIELD OF THE INVENTION

This invention relates generally to contacting gases and solids and more specifically to an Apparatus for restarting a gas-solids contactor where the gas inlet has filled with solids.

BACKGROUND

The process of bringing gases and solids into contact in materials handling procedures for various purposes including, but not limited to, drying, heating, cooling, granulating or conducting reactions are very common in many industries and it is typically beneficial to use additional solid particles to increase the solid material surface area. Such contactors may be packed beds, fluidized beds or spouting beds which differ primarily in the design of the inlets and distribution of the gas. The gas inlets may be smaller or larger than the additional solid particles. When the gas inlets are larger than the size of the solid particles the inlets can become clogged with solid material particles because the particles will flow back through the inlets when the gas supply is interrupted. When the gas supply is restored some or all of the inlets may remain plugged with solids. This then may require emptying the solids from the contactor, restarting the gas flow into an empty contactor and then adding the solids back in. Certain contactors, often termed spouted bed contactors, may have only one large inlet; such contactors are very beneficial for certain applications but are especially prone to plugging on gas flow interruption. Such contactors are becoming more popular for high temperature and high pressure operations such as coal or biomass gasification and the reaction of silicon tetrachloride and hydrogen with solid silicon.

Prior technology has primarily relied on preventing gas flow interruption or modifying the inlet size or structure. The most common approach is to prevent the particles from going into the inlets by making the inlets too small, by using self closing valves over the inlets, such as caps shown in Beranek U.S. Pat. No. 3,921,663, or balls as in Zhuber-Okrog U.S. Pat. No. 4,334,898. Another approach has been to restrict the distance the solids go when they flow backwards into the inlet by providing siphons as in Marcellini, U.S. Pat. No. 3,818,606. A yet further approach has been to allow the inlets to clog, then provide a separate unclogging gas flow as in Delebarre U.S. Pat. No. 4,880,311. Other techniques are to provide back up equipment to ensure that gas supply is not interrupted even for a brief period of time. For contactors with one or a few inlets it is possible to put solids valves on the inlets and close them rapidly if the gas flow is lost.

All the prior technologies involve significant cost and have known problems. Providing caps such as shown in Beranek and Zhuber-Okrog adds significantly to the cost and such devices are inherently prone to plugging in a solids environment because of particles jamming or otherwise interfering with the moving parts. Siphons as provided by Marcellini do not stop the backwards flow of solids because as the gas flow into the contactor is interrupted the solids and gas already in the contactor flows out of the contactor in a fluidized state and pass through the siphon. Thus a stop valve is required for each siphon as discussed in Delebarre. The approach provide by Delebarre provides a separate unclogging pipe to each orifice and valves to operate them and thus requires additional equipment and still relies on an elbow or siphon to stop the solids flow which does not work with fluidized solids. It is clear that Delebarre will also still require a stop valve as does Marcellini.

For a contacting device with a large single inlet that is typical of a spouted bed the gas flow needs to be vertical to generate the spout. Thus, cap devices are not useful because they direct the flow to the side as is seen in Beranek. Thus for such contactors significant costs are incurred by having equipment back up and an actuated solids valve close to the inlet and this valve can still fail to cut off the solids flow or may inadvertently activate when not needed. The timing of the opening and closing of the solids valve is particularly difficult. Also, as the valve is partly open there may be jetting of particles in the valve which can rapidly erode the seals of the valves. Closing the valve too fast or inadvertently will send potentially damaging pressure waves, also termed "water hammer", back through the gas source system. Closing it too late or opening it too soon may plug the inlet, resulting in contactor shutdown and cleanup.

SUMMARY

An object of the invention is to allow start or restart of a gas-solids contactor without removing some or all of the bed and cleaning out the inlet piping.

Another object of the invention is avoiding the need for a solids valve on the inlet or inlets.

Another object of the invention is to allow the emergency shutoff of the gas flow to the contactor without a problem.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, an apparatus is disclosed for starting or restarting a gas-solids contactor, while it is substantially filled with a multiplicity of solid particles, the contactor having one or more gas inlets with diameters larger than the solid particles comprising:

- a chamber located below an inlet of the gas-solids contactor,
- a gas plenum surrounding the chamber,
- one or more conduits connecting the plenum to a source of gas,
- a multiplicity of particles (also referred to as beads) substantially filling the chamber when the source of gas to the contactor is interrupted, and
- a multiplicity of passageways in the chamber walls providing a gas flow path from the plenum to the interior of the chamber, the passageways being smaller in diameter than the majority of the bed particles.

After an interruption of gas flow the particles in the bed fall into the chamber but are prevented from entering the plenum or the gas conduits because the passageways between the chamber and gas plenum are smaller than the particles. When the gas flow is restarted the gas enters the plenum and flows into the chamber through the passageways, starting localized fluidization of the particles (beads) nearest the passageways, progressively pushing the beads up into the contactor proper followed by re-establishing the jet.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a schematic diagram illustrating the operation of a prior art single inlet gas-solids contactor.

DETAILED DESCRIPTION

It is to be understood, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
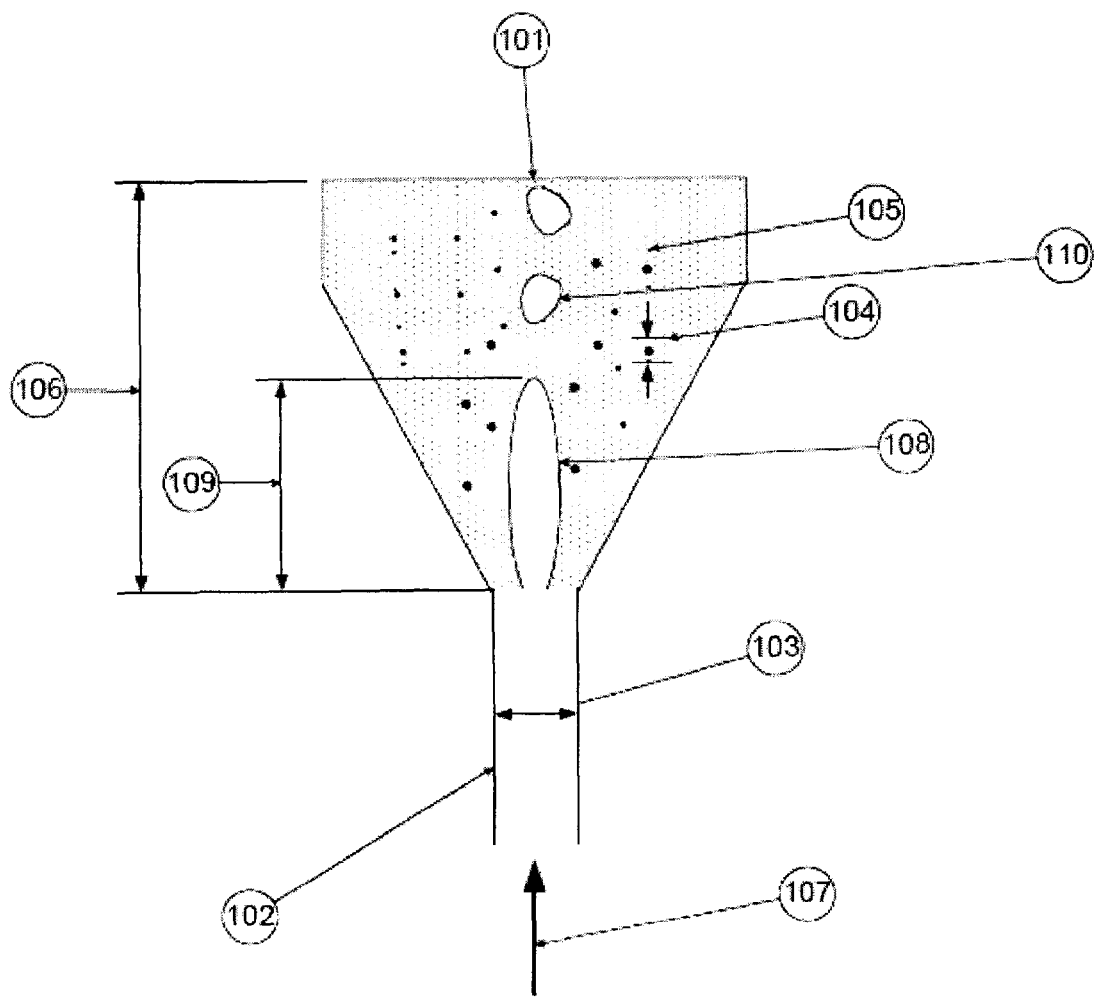

FIG. 1 shows a schematic diagram of a prior art gas-solids contactor 101 with a single inlet 102 having a diameter 103 that is larger than the diameter 104 of solid particles 105 which fill the contactor 101, the particles when fluidized filing the contactor to a bed height 106. The flowing gas 107 enters through the inlet 102 and forms a gas and particle jet 108 in the bed of particles which keeps the particles 105 from falling back into the inlet 102. When the jet height 109 exceeds the bed height 106, the contactor is called a spouting bed contactor because the jet spouts out of the top of the bed. In FIG. 1 the jet height 109 does not reach the top of the bed so the bed does not spout but instead forms bubbles 110, this means of operation being referred to as a bubbling or fluidized bed contactor. It is also possible for the gas to flow through the particles above the jet without bubbling and such beds are called packed beds. All such designs have the same problem, namely that the particles 105 can fall back into the inlet 102 on loss of gas flow. It is also possible for more than one inlet to be provided and for some inlets to have diameters smaller than the particle diameter 104 while others have diameters larger than the particle diameter 104.

Figure 2:
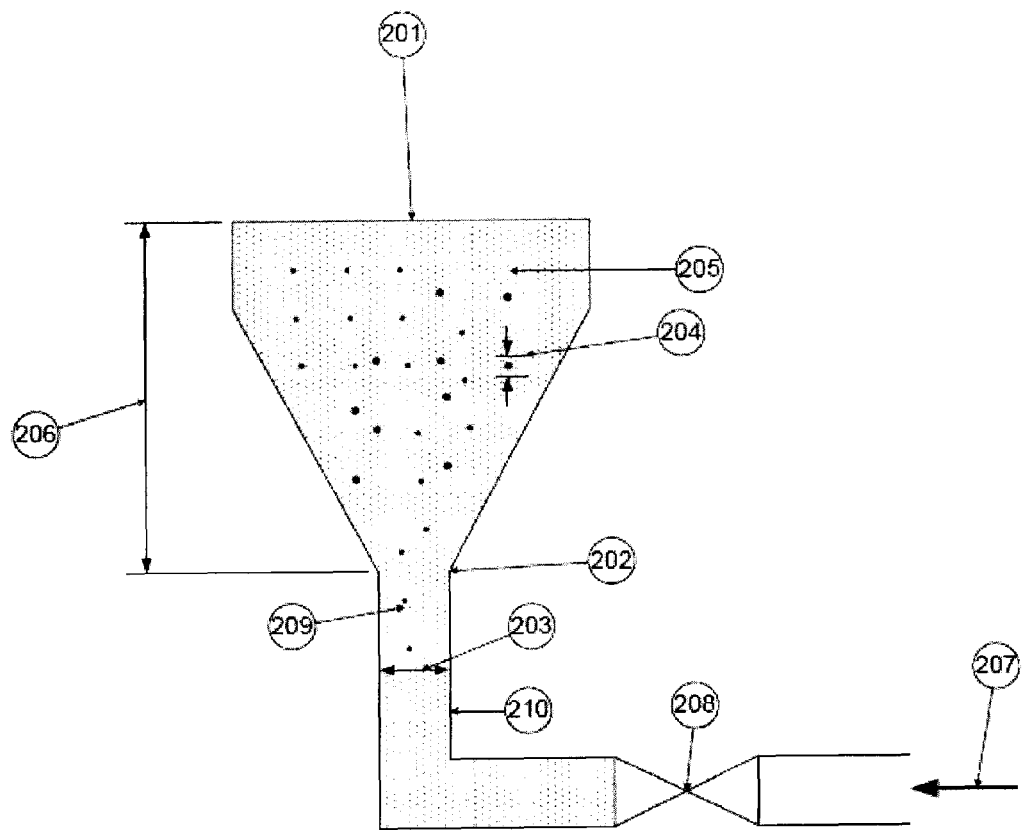
FIG. 2 is a schematic diagram illustrating the restart problem of a single inlet gas-solids contactor which does not incorporate the invention.

FIG. 2 shows a prior art gas-solids contactor 201 with a single inlet 202 having a diameter 203 that is larger than the diameter 204, of the solid particles 205 which fill the contactor 201 to a bed height 206. The flow of the gas 207 is too small to keep the particles from falling in the inlet 202. As a result the inlet 202 fills up all the way down to the valve 208, which is closed to prevent the particles flowing even further backwards. The weight of the particles in the bed presses down on the particles in the inlet 209 and pushes them against the wall, 210. When the valve 208 is opened and the flow of gas is increased to a level which should be sufficient to form a jet the particles in front of the gas flow are compressed against each other as well as against the wall 210. This behavior is similar to friction and frequently results in a plug that resists the flow and cannot be moved even if a greater pressure is applied. It can be seen that in order for the plug of particles in the inlet to be emptied, the beads in the plug must be pushed into the contactor against the force imposed by the weight of the bed.

Figure 3:
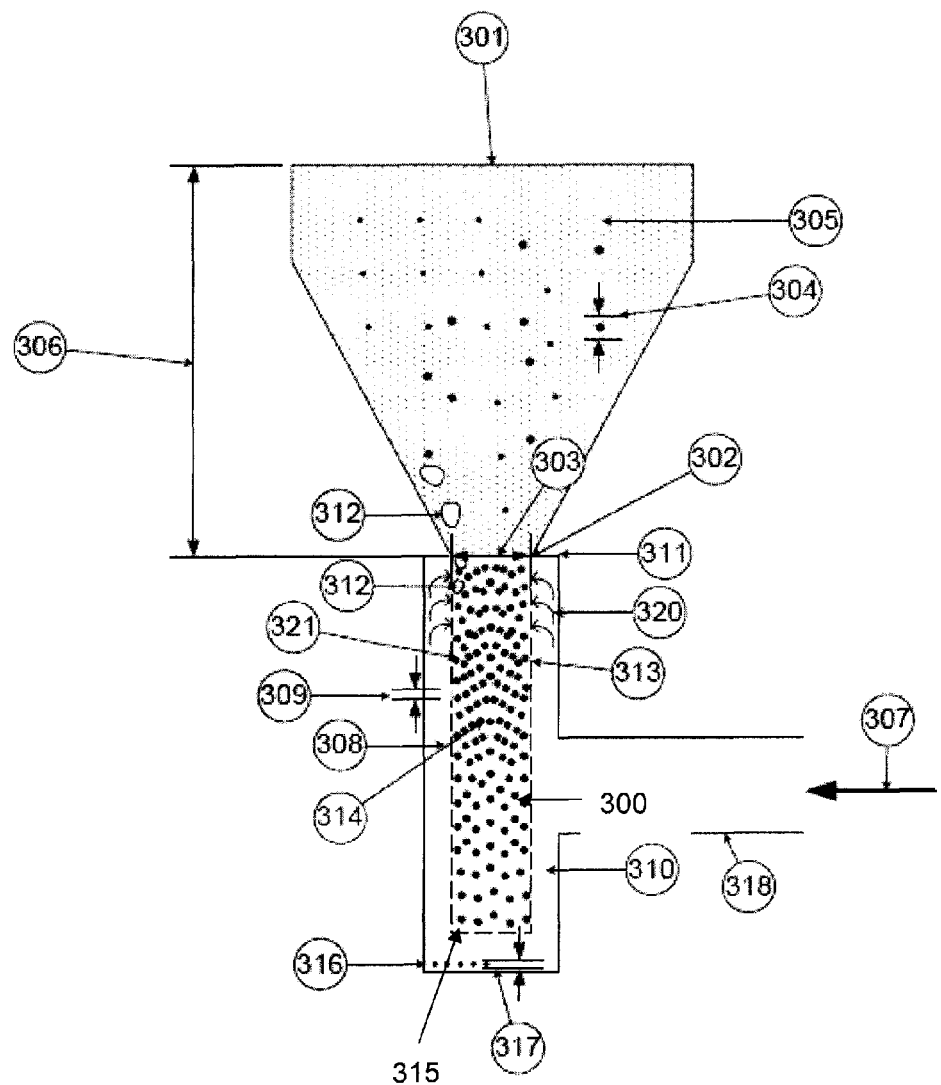
FIG. 3 is a schematic diagram illustrating how the restart of a contactor incorporating features of the invention.
Figure 8:
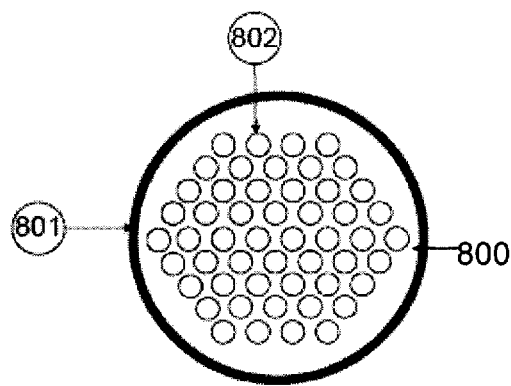
FIG. 8 is a schematic diagram illustrating the plan view of a grid plate with multiple inlets.

FIG. 3 a schematic diagram illustrating the operation of a contactor incorporating features of the invention. A contactor 301 with a single inlet 302 has a diameter 303 that is larger than the diameter 304 of the solid particles 305 which form a bed 306 in the contactor 301. A chamber 300 which has a gas permeable wall 313 is located in and extends along the length of the single inlet 302. A gas plenum 310 fills the area of the inlet 302 exterior of the chamber permeable wall 313. When there is no or inadequate flow of gas 307, the particles 304 can form a plug 314 which fills the chamber 300. Passages 308, also referred to interchangeably as passageways 308, in the gas permeable wall 313 of the chamber 300 have openings 309 with diameters smaller than the average particle diameter 304 such as may be provided by a fiber or wire mesh with openings 309 or a sintered metal sheet as discussed below in regard to FIG. 4. In a first embodiment the passages are of relatively uniform diameters along the length of the chamber wall. However, the passageways in the wall can have a different amounts of open area and in a second embodiment the open areas at the top of the chamber are greater than at the bottom of the chamber, while they are all smaller then the particle diameters, or the diameters of the majority of particles. The weights of the bed of particles 305 pressing down on the particles in the chamber 300 push the particles 304 against the gas permeable wall 313. However, the gas plenum 310 remains substantially empty of particles. Some small particles 316 with diameters 317 smaller than the diameter 309 of the passages 308 may enter the plenum. However the size or quantity of these smaller particles 316 is not sufficient to interfere with the restart, as described herein, of this embodiment. To restart the embodiment shown in FIG. 3, the flow of gas 307 is started so that the gas flows through the conduit 318 from a gas source (not shown). The gas 318 then passes through some of the passageways 308 near the top 311 of the plenum 310 where the pressure is lower, as shown by the arrows 320, and starts to form bubbles 312 along the inner surface of the wall 313, dislodging particles 305 and interfering with some of the interactive forces between the particles, 305 at the wall 313, thus reducing the friction of the bead particles within the plug in the chamber 300. Flow arrows 320 illustrate the flow path which occurs during initial startup. The flow of gas 307 then increases, forming more bubbles, these additional bubbles form lower down in the chamber 300 so that eventually the whole plug lifts up into the contactor 300 and a jet is re-established. The bottom 315 of the chamber 300 can have passageways therethrough or can be a perforated plate, such as shown in FIG. 8, that also functions as a valve (not shown in FIG. 3) for removal of the solids. The perforated plate 800 and solids removal valve can also be combined into one unit; for example, by using a slide valve where the slide plate is perforated and gas flow is injected through the perforations.

Figure 4:
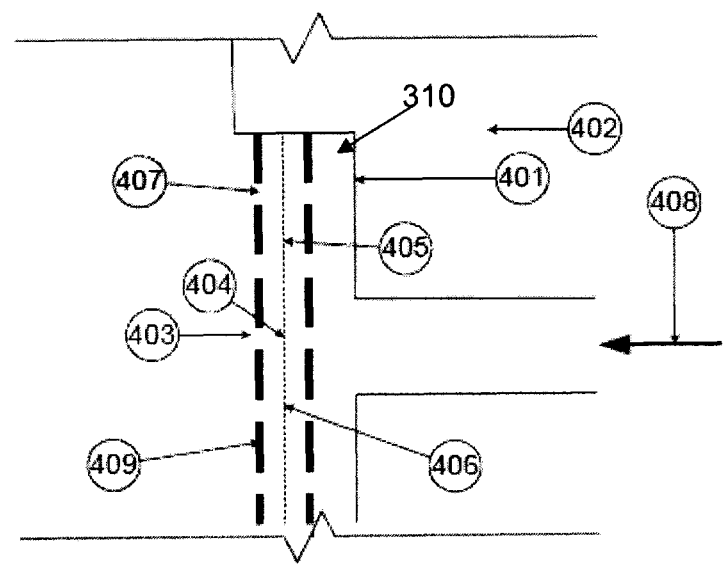
FIG. 4 is a schematic cutaway diagram illustrating the use of reinforcement to support a fabric filter.
Figure 5:
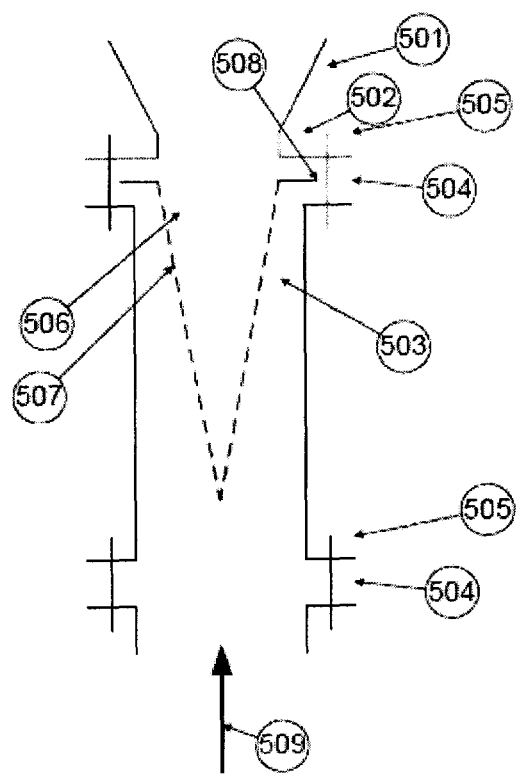
FIG. 5 is a schematic diagram illustrating use of an embodiment incorporating features of the invention utilizing an inverted cone on a single inlet.

The embodiment of FIG. 4 is an enlarged schematic drawing of FIG. 3 showing one wall 401 of the inlet 402 with the passageways 403 formed using a composite approach. Fine passageways 404 are provided by a fiber or wire mesh 405, which may have a low strength, which has small holes 406. The mesh 405 is supported by perforated plates 409 with larger holes 407 and greater strength. This embodiment provides sufficient strength to resist both the force exerted by the weight of the bed on the walls of the inlet during stoppages of the flow of gas 408 as well as the force exerted by the pressure drop across the passageways caused by gas flow during normal operation. In a further alternative the wall of the chamber is formed from a sheet of sintered metal which had suitably sized passageways there through.

Figure 6:
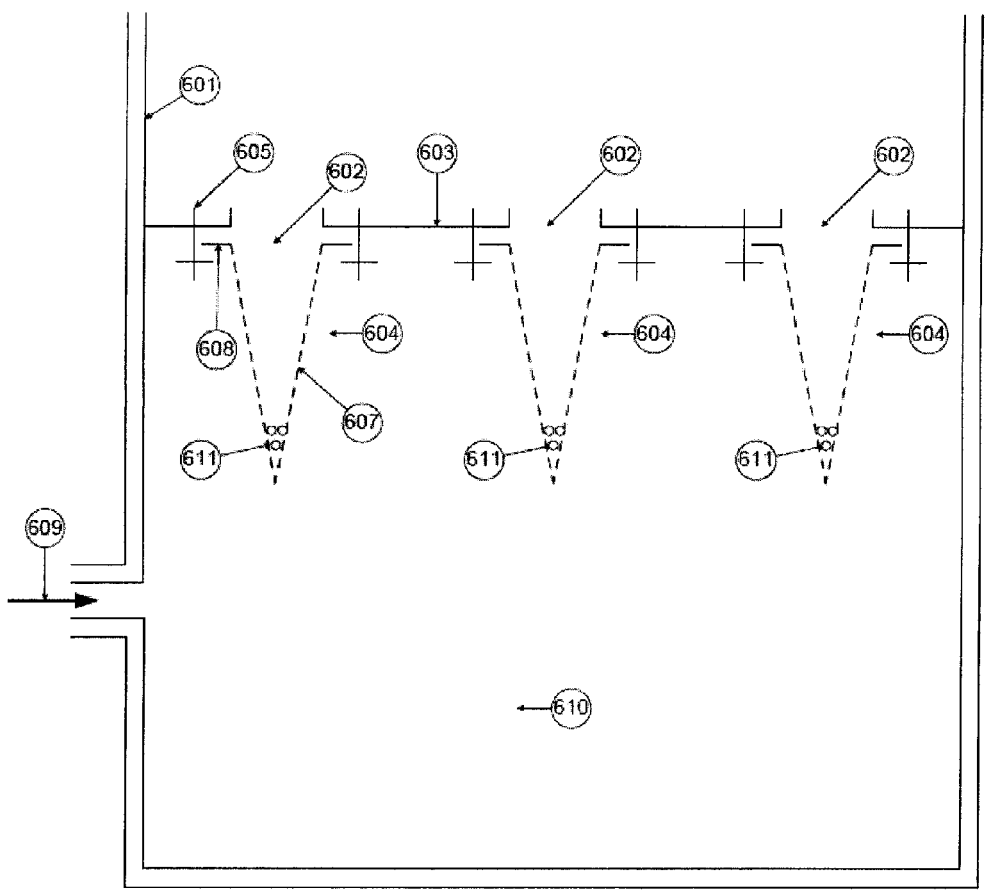
FIG. 6 is a schematic diagram illustrating use of inverted cones in a contactor with multiple inlets.

FIG. 6 shows an embodiment with multiple inlets incorporating features of the invention. The contactor 601 has multiple inlets 602, each of which has a permeable chamber 604 attached to the bottom of a grid plate 603. The gas permeable chambers 604 consist of inverted cones of a perforated plate material 607 having to a solid upper ring 608 which is attached with fasteners 605 to the underside of the grid plate 603. The plenum 610 is supplied gas from a gas source 609. Some particles 611 may remain in the chamber 604, after restart, but this has no or minimal impact on contactor performance.

Figure 7:
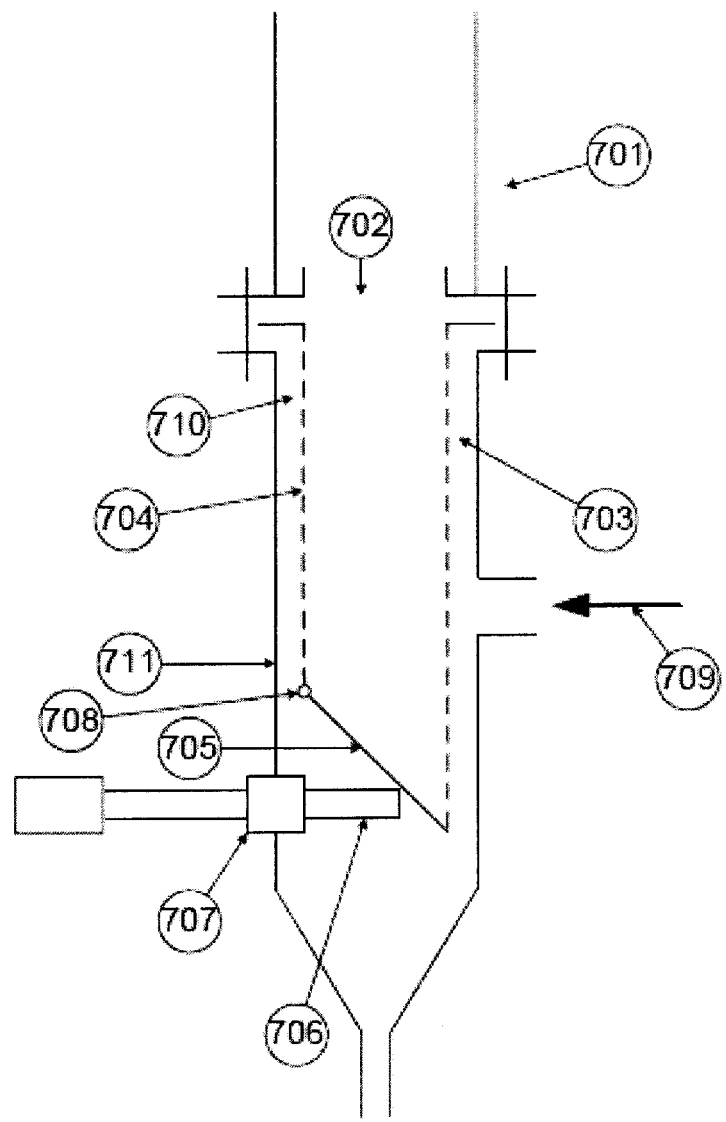
FIG. 7 is a schematic diagram illustrating an embodiment incorporating a chamber a portion of which can be opened to allow removal of the particles.

A further embodiment is shown in FIG. 7. A contactor 701 with a plenum 710 and a single inlet 702 which has a chamber 703 with a lower portion which can be opened for use as a particle drain. The chamber 703 comprises a cylindrical tube formed from a perforated plate 704 having a hinge 708 at a lower end thereof and bottom plate 705, which may be solid or perforated, attached to the bottom hinge 708. The hinged plate 705 is opened and closed by a piston 706 that extends through a gas tight seal 707 in the bottom of the wall 711 of the plenum 710. Gas is supplied to the plenum 710 by a gas source 709.

FIG. 8 shows a plan view of a grid plate 800 with multiple inlets 802 which can be integral with the shell of the chamber 801 to form the bottom of the chamber.

A particular embodiment of a contactor incorporating features of the invention comprises a contactor approximately 20 feet tall and 8 inches in diameter having a D-shaped cross section with a transparent front plate so that the internal flow patterns can be observed through the flat plate at the front of the contactor. The contactor has a hemispherical bottom section with a centrally located bottom inlet 1.25 inch in diameter. The contactor contains a bed of glass beads with a particle size between 700-850 microns and a bed height of about 10 feet.

The inlet has a gas plenum with a substantially gas tight seal between the plenum and the perforated metal wall of a chamber, as described herein positioned in the plenum. The perforated metal wall has multiple 0.0166" diameter openings therein, the area of the openings constituting 30% of the wall.

The center bottom inlet was designed as shown in FIG. 3 except that it has a D-shaped cross section and the chamber has a four inch long solid portion between the contactor inlet and the beginning of the perforated portion of the wall. The plenum is a rectangular box with a 1.25"×2.5" cross section with the gas being feed into the side of the plenum. The chamber is a half cylinder (D-shaped) with a 1.25 inch diameter. The perforated length of the metal wall of the chamber is 8 inches and the open area is 30% resulting in an open area of 4.77 square inches compared with 0.39 square inches for the cross sectional opening of the gas feed conduit 318.

The chamber was filled with particles sufficient to produce a fluidized bed height of 10 feet and the gas flow to the inlet was slowly turned on so that the bed behavior could be observed. A gas bubble quickly formed at the inner top end of the perforated metal wall. The flow was then increased slowly and the bubble height was observed to increase in size as shown in Table 1. It was observed that the gas pressure did not change significantly and that the height of the open area of the perforated metal that was free of beads (gap height) increased slowly as the gas flow increased.

TABLE 1

FLOW TEST

| FLOW SCFH | Pressure psig | Bubble Ht inch | Gap ht Inch | Comments |
|---|---|---|---|---|
| 175 | 4 | 0.25 | 0.25 | |
| 200 | 5 | 0.5 | 0.5 | |
| 220 | 6 | 0.625 | 0.625 | |
| 230 | 7 | 0.75 | 0.75 | |
| 240 | 7 | 1 | 1 | |
| 250 | 7.5 | 1 | 1 | |
| 250 | 8.5 | 1.25 | 1 | Out of perforated region |
| 250 | 9 | 1.5 | 1 | |
| 300 | 9.5 | 1.5 | 1.125 | |
| 320 | 10 | 1.75 | 1.125 | |
| 400 | 10 | 2.25 | 1.125 | |
| 400 | 9 | 2.75 | 1.25 | |
| 470 | 8 | 3 | 1.25 | |
| 500 | 6 | 4 | 1.25 | |
| 560 | 7 | | 1.25 | Tube empty |
| 580 | 7 | | 1.25 | Tube empty |
| 600 | 7.25 | | 1.25 | Jet formed |

As the flow rate was raised the bubble grew until it entered the contactor and started to form a jet. The flow was then raised further to normal operating conditions with the contents of the contactor fully fluidized. It was observed that the clear area of the perforated metal chamber at the top of the plenum was only about 1.25 inches long and that an amount of the beads remained in the non-perforated upper portion of the chamber. However, this did not appear to affect bed performance or pressure drop. Thus the length of perforated metal was much greater than was actually necessary. The usable area was 0.735 sq inches compared to the cross-sectional area of 0.713 inches.

When operated at a steady state the chamber preferably has a cross-sectional area that is less the actual volumetric gas flow at normal operation divided by the terminal velocity of the majority of the particles.

The above example illustrates at least three beneficial features of the invention. First, it is possible to apply the invention to a thick grid or to an inlet where a section of impermeable material is required between the permeable section and the actual inlet to the contactor as long as the non-perforated length is not much greater than about 4 times the diameter of the inlet. Secondly, there is no negative impact of oversizing the permeable section of the chamber, thus allowing for variation of flow in the contactor and for simplicity in sizing. Thirdly, sizing can be based on the open area of the inlet hole multiplied by a safety factor of about 1.5 rather than complex calculations on the pressure drop through an array of holes. It will be obvious to one knowledgeable in the art that there are inherent limitations to the length of the non-perforated section based on the internal angle of friction of the particular solids and the diameter of the inlet, and the application of a simplified open area formula to a permeable material with very small holes but for most practical purposes a simplified approach as described above may be adopted.

While the invention has been described in connection with a preferred embodiment, it is not intended to limit the scope of the invention to the particular form set forth. On the contrary, it is intended to cover such alternatives, modifications, and equivalents as may be included within the spirit and scope of the invention as defined by the appended claims.

I claim:

1. An improved a gas-solids contactor, said gas solids contactor having an interior space being substantially filed with a multiplicity of solid particles having a defined diameter or range of diameters, said solid particles being fluidized in the interior space by a gas stream fed to said gas-solids contactor through one or more inlets, said one or more inlets having a diameter larger than the defined diameter or range of diameters of the solid particles, said improvement comprising:

a plenum positioned between said one or more gas inlets and the interior space in the gas-solids contactor, one or more chambers positioned within said plenum and between the plenum and the interior space, the one or more chambers having a wall with a multiplicity of passageways there through and an interior volume to receive solid particles from said interior space when the source of gas to the plenum is interrupted, each of the multiplicity of passageways in the chamber wall having diameters less than the majority of the solid particles, the sum of the cross section areas of the multiplicity of passageways being at least equal to the sum of the cross section areas of the one or more inlets, wherein all of the gas entering the plenum from the gas inlets must pass through the passageways comprising the multiplicity of passageways in the chamber walls to enter the interior of the contactor.

2. The apparatus of claim 1 wherein the passageways provide an open area for transmission of gas from the plenum through the wall of the chamber that is at least as large as the cross-sectional area of a flow path into the contactor.

3. The apparatus of claim 1 wherein the chamber has a cross-sectional area that is less the actual volumetric gas flow at normal operation divided by the terminal velocity of the majority of the particles.

4. The apparatus of claim 1 wherein said passageways in the wall of the chamber have a different amount of open area at the top of the chamber than at the bottom of the chamber.

5. The apparatus of claim 1 wherein the wall of the chamber comprises a fiber or wire mesh.

6. The apparatus of claim 1 wherein said passageways in the wall of the chamber are holes in a perforated plate.

7. The apparatus of claim 1 wherein the wall of the chamber comprises a sheet of sintered metal providing passageways therethrough.

8. The apparatus of claim 1 wherein some or all of the sides of the chamber are reinforced to resist either or both of the forces exerted by the particles and the difference of the gas pressure between the plenum and the chamber.

9. The apparatus of claim 1 wherein a portion of the chamber is openable to provide a passage for removing the particles from the contactor and chamber.

* * * * *